PULSE COMMUNICATION SYSTEM TRANSMITTER EQUIPMENT

Filed Nov. 5, 1962 3 Sheets-Sheet 1

INVENTOR
Derek George Woodward Ingram
BY Kurschen, Kurschen & Ottinger
ATTORNEYS INVENTOR
Derek George Woodward Ingram
BY Kurt Kelman, Kindeler + Ottinger
ATTORNEYS INVENTOR
DEREK GEORGE WOODWARD INGRAM
BY Kinchloe, Kinchloe & Ottinger
ATTORNEYS United States Patent Office 3,174,101
Patented Mar. 16, 1965

3,174,101

PULSE COMMUNICATION SYSTEM TRANSMITTER EQUIPMENT

Derek George Woodward Ingram, Harrow, Middlesex, England, assignor to The General Electric Company Limited, London, England Filed Nov. 5, 1962, Ser. No. 235,375
Claims priority, application Great Britain, Nov. 7, 1961, 39,841/61
11 Claims. (Cl. 325—44)

This invention relates to electric signal handling equipment. More particularly, but not exclusively, the invention relates to electric signal handling equipment which may be used in pulse communication systems.

In known pulse communication systems, the voltages of a plurality of audio frequency signals which are to be transmitted over the system are sampled in rotation at frequent, regularly recurrent instants. The sample voltages so obtained are then used to control the production for transmission of a pulse signal which defines the values of the sample voltages.

It is an object of the present invention to provide improved electric signal handling equipment which may be used as part of apparatus for performing the operations set out in the last paragraph.

According to the present invention, electric signal handling equipment comprises means periodically to sample the voltage of an input signal, first and second means to each of which each such sample voltage is supplied, the first and second means each being arranged to supply a pulse signal which defines the magnitude of the sample voltage, but the first means being such as only to supply said pulse signal when the sample voltage is positive and the second means being such as only to supply said pulse signal when the sample voltage is negative, the arrangement being such that the pulse signal supplied by the first or second means defines the magnitude of the sample voltage, and which of the first and second means supplies the pulse signal indicates the polarity of the sample voltage.

Figure 1:
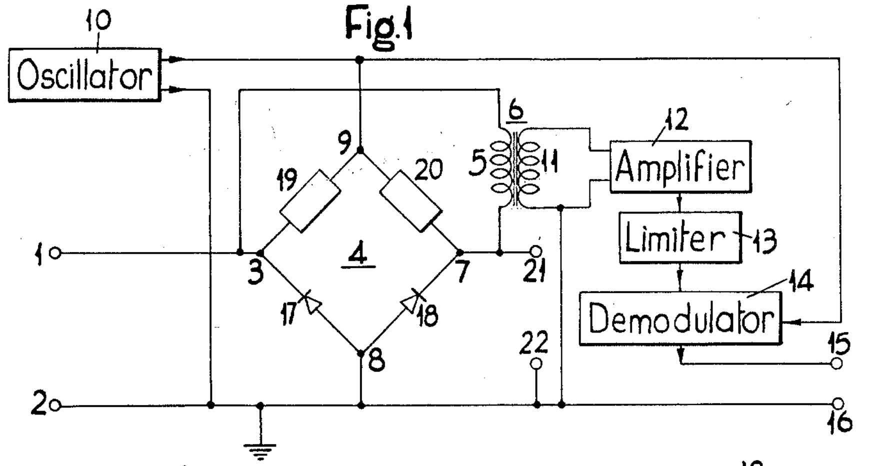
Figure 3:
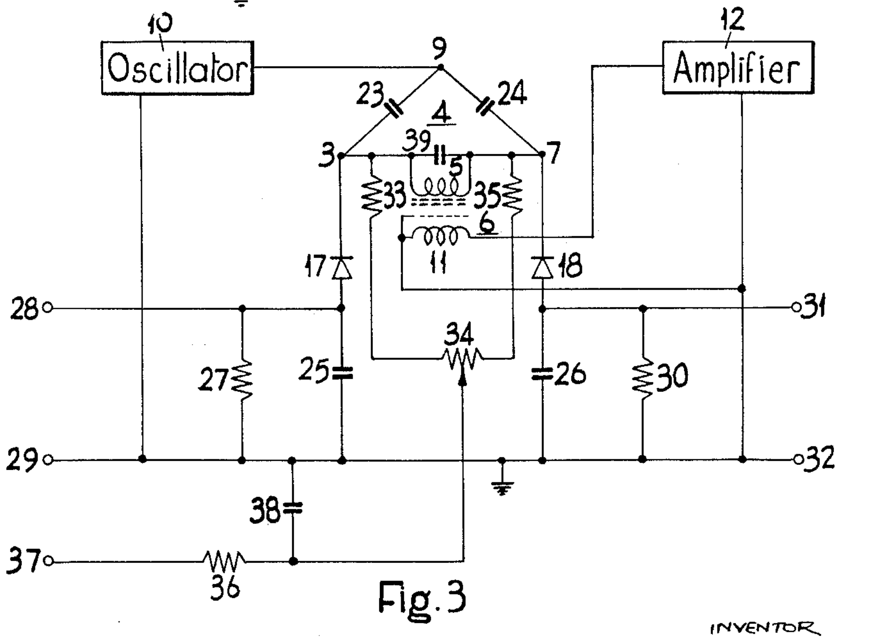
Figure 2:
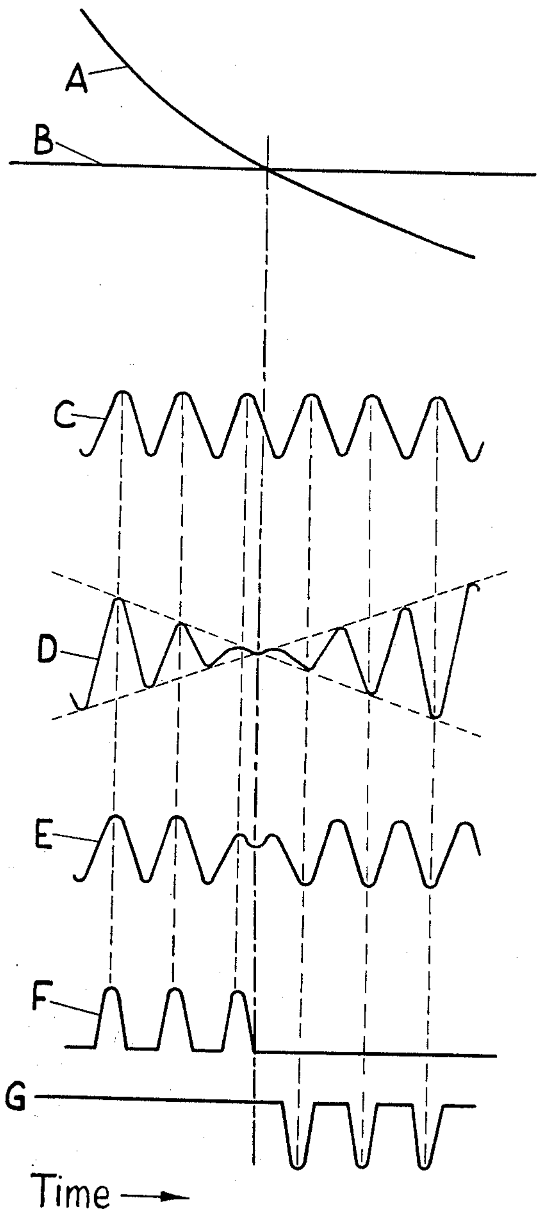
Figure 4:
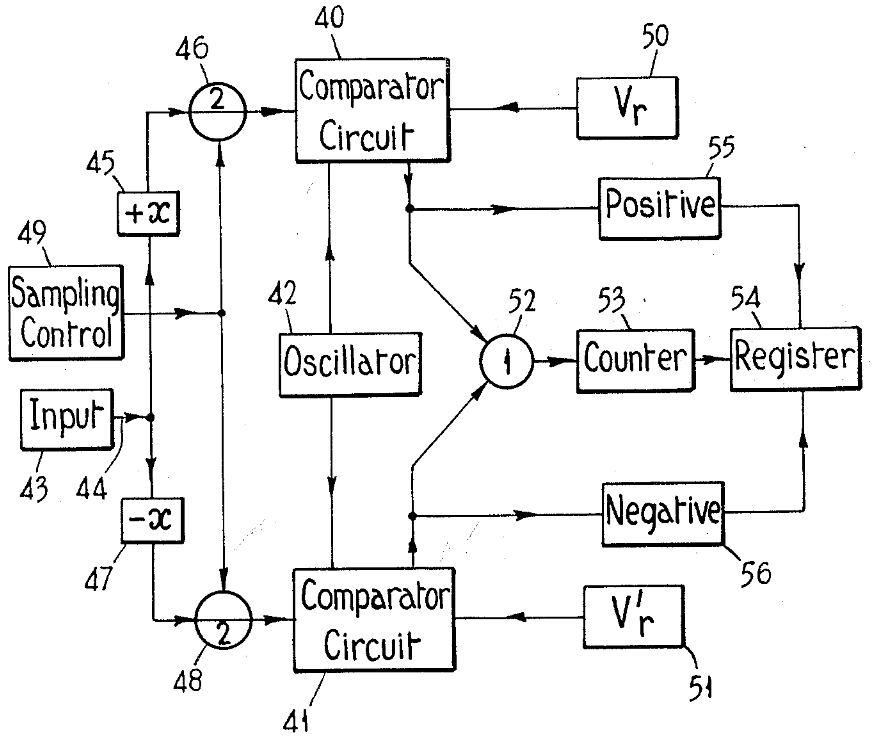

Electric signal handling equipment in accordance with the present invention will now be described by way of example with reference to the accompanying drawings, in which:

FIGURE 1 shows, in simplified form, a circuit which forms part of the equipment, FIGURE 2 shows the waveform of signals which appear at various points in the circuit of FIGURE 1 during operation, FIGURE 3 shows the circuit of FIGURE 1 in more detail, and FIGURE 4 shows the equipment in block schematic form.

The equipment to be described forms part of the transmitter of a pulse code modulation communication system. Before referring to the drawings, the system and, in particular, the transmitter will be briefly described in order to provide a background against which the operation of the equipment may be more readily understood.

The system is a twenty-five channel time division multiplex telephone system, over which up to twenty-five audio frequency signals may be passed simultaneously. The signal passed from the transmitter to the receiver comprises a pulse signal, having a pulse repetition frequency of 2 megacycles per second. This signal is made up of successive groups of two hundred pulse positions, each position of which may or may not be occupied by a pulse for the purpose of indicating the presence or absence of a digit respectively. Each group of two hundred pulse positions falls into twenty-five channel groups, respectively, each channel group comprising eight pulse positions. In each channel group, the first (or the last) seven pulse positions give the required information concerning the audio frequency signal to be transmitted over that channel, and the eighth pulse position may be used for the purpose of signalling and synchronising.

Considering now the transmitter, the voltages of the incoming audio frequency signals which are to be transmitted are sampled in rotation, 10,000 times per second. The sample voltages so obtained, may, of course, be of either polarity, but for the present it will be assumed that they are all of negative polarity.

To each sample voltage there is then added a direct current component of the same polarity (negative), this component being hereinafter referred to as an added voltage $x$.

As there are twenty-five channels and the incoming audio frequency signal on each of these channels is sampled 10,000 times per second, the sampling period available for obtaining a sample on a channel and performing the required operations subsequent to sampling is 4 microseconds.

The equipment at the transmitter which is common to all the channels includes a capacitor which has associated with it an arrangement of gates whereby, during each sampling period of 4 microseconds, the capacitor goes through the following sequence of operations. Initially the capacitor is charged to a level $s+x$, $s$ corresponding to the level of the relevant sample voltage. Next, the charge on the capacitor is permitted to decay exponentially by way of a resistor through which the capacitor is able to discharge to earth. The time constant of the decay is dependent on the values of the capacitor and the resistor. These are chosen such that in the case where the charge initially stored on the capacitor has the maximum possible value, the charge on the capacitor will have decayed to the level corresponding to the added voltage $x$ just prior to the end of that part of the sampling period allotted to the decay of the charge on the capacitor. Subsequent to this, during the last part of the sampling period, the capacitor is discharged in preparation for having stored upon it a charge corresponding to the sample voltage in respect of the incoming audio frequency signal on the next channel.

During the period when the charge on the capacitor is decaying, a signal the level of which corresponds to the charge remaining on the capacitor, is supplied to a comparator circuit to which is also supplied a signal having a constant level corresponding to the added voltage $x$. (In fact the level of this other signal may not correspond exactly to the added voltage $x$, for a reason to be mentioned later.)

The comparator circuit is arranged to produce a pulse signal comprising pulses having a repetition frequency of 16 megacycles per second. The beginning of this pulse signal coincides in time with the instant when the charge on the capacitor starts to decay, and the end of this pulse signal coincides in time with the instant when the charge on the capacitor has decayed to the level corresponding to the added voltage $x$, that is to say, the instant the voltages of the two signals supplied to the comparator circuit are of equal value. The number of pulses in the pulse signal therefore defines the magnitude of the corresponding sample voltage.

It should be appreciated that although the number of pulses in the pulse signal unambiguously defines the magnitude of the corresponding sample voltage, the number of pulses is not linearly proportional to the magnitude of the corresponding sample voltage. The result of this want of linear proportionality between the number of pulses in the pulse signal, and the magnitude of the corresponding sample voltage, is that a change in the voltage of an incoming audio frequency signal, which change brings about a change of one in the number of pulses in the pulse signal, represents a smaller change in the voltage of an audio frequency signal of comparatively small amplitude than it does in the case of an audio frequency signal of comparatively large amplitude. This has the effect of improving the signal to noise ratio of an audio frequency noise signal of comparatively small amplitude.

Each pulse signal is then supplied to a counter which counts the number of pulses and codes the resulting count to provide a pulse output which occupies six pulse positions in a channel group. The arrangement for dealing with the polarity of each sample voltage is used to provide a pulse, or not, as the case may be, for the seventh pulse position in the channel group, the eighth pulse position remaining for the purpose of signalling and synchronising.

Referring now to FIGURE 1 of the drawings, the part of the transmitter shown comprises the comparator circuit which, as shown in simplified form in FIGURE 1 includes input terminals 1 and 2, the terminal 2 being connected to earth. The terminal 1 is connected to a point 3 which is at one end of a diagonal of a bridge network 4, and also by way of the primary winding 5 of a transformer 6 to a point 7 which is at the other end of that diagonal. (Some arrangement, for example a capacitor, is provided to give direct current blocking between the points 3 and 6. This arrangement is not shown in FIGURE 1.)

Points 8 and 9 are situated at the ends of the other diagonal of the bridge network 4, the point 8 being connected to earth, and an oscillator 10 which supplies a signal having a frequency of 16 megacycles per second, is connected between the points 8 and 9. The secondary winding 11 of the transformer 6 is connected to the input of an amplifier 12, one terminal of the secondary winding 11 also being connected to earth. The output of the amplifier 12 is connected by way of a limiter 13 to a phase sensitive demodulator 14, to which the output of the oscillator 10 is also connected. Output terminals 15 and 16 are connected to the output of the demodulator 14 and to earth, respectively.

Similar semiconductor junction diodes 17 and 18 are connected between the points 3 and 8, and 7 and 8, respectively, each of the diodes 17 and 18 having its anode terminal nearer the point 8. Impedances 19 and 20 are connected between points 3 and 9, and 7 and 9, respectively. Terminals 21 and 22 are connected to the points 7 and 8, respectively. Some arrangement (not shown) is also provided to reverse bias each of the diodes 17 and 18.

During operation, an input signal having a voltage $V_s$, which corresponds to the charge remaining on the capacitor which was initially charged to the voltage $s+x$, is applied between the terminals 1 and 2, that is across the diode 17. At the same time a reference signal having a voltage $V_r$, which corresponds to the voltage $x$, is applied between the terminals 21 and 22, that is across the diode 18. Under conditions of reverse bias the diodes 17 and 18 appear as capacitor shunted by resistors of very large value, due to the capacitance of the semiconductor junctions. At the high frequencies involved the resistors may be neglected and the values of the capacitors are dependent on the voltages applied across the diodes 17 and 18. If then the values of the impedances 19 and 20 are adjusted so that the bridge network 4 is balanced when:

$$V_s = V_r$$

then clearly any variation in $V_s$ will cause a change in the capacitance of the diode 17 which will cause the bridge network 4 to become unbalanced.

An increase in the magnitude of $V_s$ will reduce the capacitance of the diode 17 and a decrease in the magnitude of $V_s$ will increase the capacitance of the diode 17. If it is assumed that the impedances 19 and 20 are capacitors (although this is not essential), and that the input impedance of the amplifier 12 is high, then the voltages between the point 3 and earth, and between the point 7 and earth will be in phase with the output of the oscillator 10. This means that the input to the amplifier 12 will either be in phase or 180° out of phase with the output of the oscillator 10. Furthermore, it is arranged that the gain of the amplifier 12 is sufficiently high for the limiter 13 to maintain an output of substantially constant amplitude except when the bridge network 4 is very close to being balanced.

The waveforms of signals appearing at various points in the arrangement of FIGURE 1 are then as shown in FIGURE 2 of the drawings, to which reference is now also made. Waveform A represents the voltage $V_s$, the level of which falls exponentially as the capacitor from which the input signal is derived discharges. The waveform B represents the reference voltage $V_r$, whilst the waveform C represents the output of the oscillator 10.

The input to the amplifier 12 is then as represented by the waveform D, the amplitude of this input decreasing to pass through zero amplitude at the instant when the levels of the voltages $V_s$ and $V_r$ are equal, and then increasing again. In addition, the phase of the signal represented by the waveform D changes by 180° as the bridge network 4 passes through the balance condition. The waveform E represents the output supplied by the limiter 13 to the demodulator 14, this output being of constant amplitude except in the region where the bridge network 4 passes through the balance condition.

Waveforms F and G represent two alternative outputs which may be derived from the demodulator 14 between the terminals 15 and 16. In the present case the output represented by the waveform F is required, this output comprising a pulse signal including a train of pulses which is arranged to begin when the capacitor from which the input voltage $V_s$ is derived starts to discharge, and which ends, as shown, when the levels of the input voltages $V_s$ and $V_r$ are equal. The number of pulses in the pulse signal represented by the waveform F therefore defines the amplitude of the corresponding sample amplitude of an audio frequency signal, as required.

The demodulator 14 may, incidentally, be looked upon as an AND gate.

The variations in the capacitance of the diodes 17 and 18 with temperature is small, and no control of their temperature may therefore be necessary. If desired, however, the diodes 17 and 18 may both be mounted in the same copper block thus ensuring that the diodes 17 and 18 are both at the same temperature, or, for still greater accuracy, in a temperature controlled enclosure, which can be of conveniently small size due to the small size of the diodes 17 and 18. As a further alternative the impedances 19 and 20 may be arranged to be temperature sensitive and to vary with temperature in such a way to compensate for changes in the capacitances of the diodes 17 and 18 with temperature. The capacitance of the diodes 17 and 18 does not vary appreciably with frequency, and hence there is no inherent limit on the frequency at which the arrangement can be operated.

The arrangement is shown in greater detail in FIGURE 3 of the drawings, to which reference is now made. Where possible similar reference numerals are used in FIGURES 1 and 3.

In this arrangement the impedances 19 and 20 of FIGURE 1 are capacitors 23 and 24 of equal value. The diodes 17 and 18, which are in fact Zener diodes, although this is not essential, are provided as before, the anode terminals of the diodes 17 and 18 being connected to earth by way of capacitors 25 and 26, respectively. The capacitor 25 is shunted by a resistor 27 the ends of which are connected to input terminals 28 and 29. The capacitor 26 is shunted by a resistor 30, the ends of which are connected to input terminals 31 and 32. The impedances measured between the diodes 17 and 18 and earth are very low at a frequency of 16 megacycles per second, and do not therefore materially effect the operation of the bridge network 4.

The capacitor 25 is the capacitor which, during operation, is charged to the voltage $s+x$ by means of a signal supplied between the terminals 28 and 29. The capacitor 25 then discharges to earth through resistor 27 with the required time constant. The reference voltage $V_r$ is applied continuously between the terminals 31 and 32, the capacitor 26 and the resistor 30 being included merely to make the initial balancing of the bridge network 4 easier.

The point 3 is connected to the point 7 by way of a resistor 33, a potentiometer 34, and a resistor 35 equal in value to the resistor 33, connected in series in that order. The potentiometer 34 has a variable tapping point which is connected by way of a resistor 36 to a terminal 37, the end of the resistor 36 nearer the potentiometer 34 being decoupled to earth by way of a capacitor 38. During operation, a potential is applied to the terminal 37 for the purpose of reverse biasing the diodes 17 and 18.

The transformer 6 with primary winding 5 and secondary winding 11, is provided as before, the primary winding 5 being tuned to a frequency of 16 megacycles per second by a capacitor 39. The secondary winding 11 is connected to the input of the amplifier 12.

In a typical embodiment of the comparator circuit of FIGURE 3 some of the components are as follows:

| | | |
|---|---|---|
| Capacitors 23 and 24 | picofarads | 47 |
| Capacitors 25 and 26 | do | 1,000 |
| Resistors 27 and 30 | kilohm | 1 |

The diodes 17 and 18 are Zener diodes, and have a capacitance of about 50 picofarads when a reverse bias of 2 volts is applied across them.

The operation of the comparator circuit is then similar to that described with reference to FIGURE 1. To balance the bridge network 4 initially, the position of the tapping point on the potentiometer 34 is varied, this having the effect of compensating for any want of equality in the resistive part of the junction impedance of the diodes 17 and 18 when reverse biased. This want of equality will arise where, as is likely, the diodes 17 and 18 are not exactly identical.

If this is so the capacitive part of the impedance of the diodes 17 and 18 may also be unequal, and this inequality cannot be corrected merely by varying the position of the tapping point on the potentiometer 34. As, however, the junction capacitance of the diodes 17 and 18 is dependent upon the applied voltage, the capacitance of the diode 18 can be made equal to that of the diode 17 by varying the value of the reference voltage $V_r$. This means that the reference voltage $V_r$ does not correspond exactly to the added voltage $x$, but this does not, in fact, affect the operation.

The value of the reverse bias applied to the diodes 17 and 18 will normally only be a few volts, and this means that it would not be impossible for the instantaneous sum of the input voltage $V_s$ and the oscillatory signal supplied by the oscillator 10 to be such as to cause the diodes 17 and 18 to conduct, either in their forward direction or by reverse breakdown. Such conduction, caused by a large value of input voltage $V_s$, will only occur when the bridge network 4 should, in any case, be unbalanced, and will not therefore affect the operation. The amplitude of the signal supplied by the oscillator 10 should, however, be sufficiently small to prevent either of the diodes 17 or 18 conducting at times when the bridge network 4 is close to balance.

The amplifier 12 has a broad bandpass, covering the frequency range 8 to 24 megacycles per second. The amplifier 12 should not respond to signals having low frequencies, as otherwise its output will include components of the input voltage $V_s$. It is also desirable that the amplifier 12 should reject second and higher harmonics of the signal supplied by the oscillator 10. On the other hand, the pass band of the amplifier 12 should be fairly wide, to give a good transient response.

As previously stated, the overall phase shift between the oscillator 10 and the demodulator 14 (FIGURE 1) must be zero or 180 degrees, so that if any phase shift (additional to the required phase reversal) occurs in the bridge network 4, an appropriate correction should be made by the amplifier 12.

Up to now it has been assumed that all the sample voltages are of the same polarity. In practice, of course, the sample voltages may be of either polarity, and consideration will now be given to the complete equipment, which is such as to be able to deal with sample voltages of either polarity.

The equipment is shown in block schematic form in FIGURE 4 of the drawings, to which reference is now made. The equipment includes two comparator circuits 40 and 41 each of which is similar to the comparator circuit which has been described with reference to FIGURES 1 to 3. In the case of the comparator circuit 41, however, the diodes 17 and 18, and their biasing arrangements, are reversed. Also, the comparator circuits 40 and 41 do not each have an oscillator 10 (FIGURE 3), a single oscillator 42 being provided.

As previously mentioned, the transmitter includes in its input stages 43 means to sample each of the incoming audio frequency signals in rotation. The input stages 43 therefore include twenty-five channel sampling gates which are opened in rotation, and which as a result supply a pulse amplitude modulated signal to a common line 44. Successive pulses in this signal correspond to pulses from successive audio frequency signals in rotation.

The common line 44 is connected by way of a circuit 45 to a gate 46, and by way of a circuit 47 to a gate 48. The circuit 45 operates to add to the signal supplied over the common line 44 a voltage $x$, and the circuit 47 operates to subtract from the signal supplied over the common line 44 the same voltage $x$. The voltage $x$ is positive.

The gates 46 and 48 are similar, and each is a high-speed linear AND gate, the gates 46 and 47 being controlled to open simultaneously by a sampling control circuit 49. The periods for which the gates 46 and 48 are open are shorter than the periods for which the channel gates in the input stages 43 are open, and the periods for which the gates 46 and 48 are open are approximately centered in the periods during which any channel gate in the input stages 43 is open.

The outputs of the gates 46 and 48 are connected to the comparator circuits 40 and 41, respectively. Also connected to the comparator circuits 40 and 41 are circuits 50 and 51, respectively, which supply voltages $V_r$ and $V_r'$ to the comparator circuits 40 and 41, respectively.

The outputs of the comparator circuits 40 and 41 are both connected to an OR gate 52, the output of which is connected to a pulse counter 53. The output of the pulse counter 53 is connected to an eight-stage register 54. The outputs of the comparator circuits 40 and 41 are also connected to circuits 55 and 56 which operate to sense whether the relevant comparator circuit 40 or 41 is supplying an output signal, and in dependence upon this to supply a signal to the register 54.

The operation of the equipment is then as follows. Considering a single pulse of the signal supplied over the common line 44, this pulse corresponds to a sample voltage of one of the audio frequency signals and may be assumed to have a voltage $s$. The sample voltage $s$ may be either negative (as previously considered) or may be positive. The circuit 45 then supplies a voltage $s+x$ to the gate 46, and the circuit 47 supplies a voltage $s-x$ to the gate 48 ($x$ being negative as before). The gates 46 and 48 therefore operate to supply pulses having the same voltages, respectively, to the comparator circuits 40 and 41.

This means that the comparator circuit 40 has supplied across the diode 17 (FIGURE 3) a signal having a voltage $V_s$, which corresponds to the charge remaining on the capacitor 25 (FIGURE 3) which is initially charged to a voltage $s+x$. At the same time a reference signal having a voltage $V_s$, which corresponds to the voltage $x$, is supplied across the diode 18 (FIGURE 3).

The comparator circuit 40 operates in a similar way to that previously described, and supplies a pulse signal, as represented by the waveform F of FIGURE 2, in cases when $s+x$ is algebraically less than $x$. In other words, the compartor circuit 40 only supplies a pulse signal when $s$ is negative.

In the case of the comparator circuit 41 there is supplied across the diode 17 (FIGURE 3) a signal having a voltage $V_s'$, which corresponds to the charge remaining on the comparator 25 (FIGURE 3) which is initially charged to a voltage $s-x$. At the same time a reference signal having a voltage $V_r'$, which corresponds to the voltage minus $x$, is supplied across the diode 18 (FIGURE 3).

Apart from these modifications in the signals, the comparator circuit 41 operates in a similar way to the comparator circuit 40. The comparator circuit 41 therefore supplies a pulse signal, as represented by the waveform F of FIGURE 2, in cases when $s-x$ is algebraically greater than minus $x$. In other words, the comparator circuit 41 only supplies a pulse signal when $s$ is positive.

The outputs of the comparator circuits 40 and 41 are supplied to the gate 52, and to the circuits 55 and 56.

In the case of any sample voltage, therefore, the gate 52 supplies an output pulse signal, the number of pulses being counted by the counter 54 and the count being registered in the first six stages of the register 54. This count defines the magnitude of the sample voltage. Depending on the polarity of the sample voltage, either the comparator circuit 40 will supply a pulse signal to the circuit 55, or the comparator circuit 41 will supply a pulse signal to the circuit 56. Depending on whether the comparator circuit 40 or 41 is supplying the pulse signal, therefore, a pulse, or not, as the case may be, is supplied to the seventh stage of the register 54 to indicate the polarity of the sample voltage.

It is not strictly essential to have both the circuits 55 and 56, although if both are provided they can be used to provide a check that the equipment is operating correctly.

The transmitter also includes means to supply to the eighth stage of the register 54 a pulse, or not, as the case may be, for the purpose of signalling or synchronizing. This completes the channel group in respect of that particular sample voltage, this channel group then being transmitted.

A number of modifications are possible, in particular it is not essential to use ordinary four arm bridge networks so long as the networks used can be balanced and, when not balanced, each supplies an output signal which is characteristic of the side of the balance condition on which that network is operating. Furthermore, it is not essential that the input signal to these networks be oscillatory, as pulse signals could, for example, be used.

Although the signal handling equipment has been described as forming part of a pulse code modulation communication system, its utility is not limited in this respect.

I claim:

1. Pulse communication system transmitter equipment comprising sampling means periodically to sample the voltage of an input signal, first coding means to supply a pulse signal defining the magnitude of a positive sample voltage applied thereto, second coding means to supply a pulse signal defining the magnitude of a negative sample voltage applied thereto, means connecting said sampling means to each said coding means to apply each sample voltage from said sampling means to both of said coding means, combining means to combine pulse signals into a form suitable for transmission over a single communication path and means connecting both coding means to said combining means to supply pulse signals obtained from these coding means to said combining means.

2. Electric signal handling equipment comprising sampling means periodically to sample the voltage of an input signal, a first comparator circuit to supply a pulse signal defining the magnitude of a positive sample voltage applied thereto, a second comparator circuit to supply a pulse signal defining the magnitude of a negative sample voltage applied thereto, and means connecting said sampling means to each of said comparator circuits to apply each sample voltage from said sampling means to both of said comparator circuits; each said comparator circuit including a bridge network having four impedance arms, a capacitative impedance which is in one of said arms and of which the capacitance varies with applied voltage, means to apply a varying voltage to this capacitative impedance in respect of each sample voltage applied to the comparator circuit, and another capacitative impedance in a second one of said arms to obtain balance of the bridge network at a predetermined value of the varying voltage, the bridge network supplying an output signal for other values of the varying voltage that is characteristic of the side of the balance condition on which the bridge network is operating.

3. Equipment in accordance with claim 2 wherein, in both the first and the second comparator circuits, said varying voltage which is supplied across the capacitative impedance the capacitance of which varies with applied voltage has an initial value which is characteristic of the value of the sample voltage and said varying voltage thereafter varies in a predetermined manner.

4. Equipment in accordance with claim 2 wherein the capacitative impedance the capacitance of which varies with applied voltage is the capacitative part of the junction impedance of a semiconductor junction diode which is biased in its reverse direction.

5. Equipment in accordance with claim 4 wherein said other capacitative impedance is a capacitor of fixed value.

6. Equipment in accordance with claim 4 wherein said other capacitative impedance is the capacitative part of the junction impedance of a diode which is similar to the first-mentioned diode and which is also biased in its reverse direction.

7. Equipment in accordance with claim 2 further comprising means arranged to supply an oscillatory signal across one diagonal of each of the bridge networks, and the first and second comparator circuits each includes means to derive said output signal from across the other diagonal of the bridge network.

8. Equipment in accordance with claim 7 wherein each of said output signals is in phase with, or 180 degrees out of phase with, said oscillatory signal, depending upon the side of the balance condition on which the relevant bridge network is operating.

9. Equipment in accordance with claim 8 in which the first and second comparator circuits each includes a phase sensitive demodulator to which said output signal and a portion of said oscillatory signal are arranged to be supplied, the demodulator then supplying a pulse signal which begins or ends at the instant the bridge network passes through the balance condition, the demodulator of the first comparator circuit supplying such pulse signal only when the sample voltage is of positive polarity and the demodulator of the second comparator circuit supplying such a pulse signal only when the sample voltage is of negative polarity.

10. Equipment in accordance with claim 9 further comprising a gating circuit to which the pulse signals from the demodulators are supplied, the signal supplied by the gating circuit then being said pulse siganl which defines the magnitude of the sample voltage.

11. Equipment in accordance with claim 10 further comprising means to sense which of the demodulators supplies a pulse signal to the gating circuit in respect of each sample voltage and hence to supply a signal which indicates whether the sample voltage is of positive or negative polarity.

References Cited by the Examiner

UNITED STATES PATENTS

| | | | |
|---|---|---|---|
| 3,056,085 | 9/62 | James et al. | 179—15 XR |
| 3,103,647 | 9/63 | Dorros | 328—118 XR |

DAVID G. REDINBAUGH, *Primary Examiner.*